United States Patent
Li et al.

(10) Patent No.: US 11,936,257 B2
(45) Date of Patent: Mar. 19, 2024

(54) TRANSVERSE MAGNETIC FLUX MOTOR

(71) Applicants: HUAI'AN WELLING MOTOR MANUFACTURING CO., LTD., Jiangsu (CN); GUANGDONG WELLING MOTOR MANUFACTURING CO., LTD., Guangdong (CN)

(72) Inventors: Wenrui Li, Jiangsu (CN); Yajun Zuo, Jiangsu (CN); Hu Li, Jiangsu (CN); Minghu Yu, Jiangsu (CN)

(73) Assignees: HUAI'AN WELLING MOTOR MANUFACTURING CO., LTD., Jiangsu (CN); GUANGDONG WELLING MOTOR MANUFACTURING CO., LTD., Guangdong (CN)

( * ) Notice: Subject to any disclaimer, the term of this patent is extended or adjusted under 35 U.S.C. 154(b) by 200 days.

(21) Appl. No.: 17/244,063

(22) Filed: Apr. 29, 2021

(65) Prior Publication Data
US 2021/0265901 A1 Aug. 26, 2021

Related U.S. Application Data

(63) Continuation of application No. PCT/CN2019/114215, filed on Oct. 30, 2019.

(30) Foreign Application Priority Data

Oct. 31, 2018 (CN) .......................... 201811288026.5
Oct. 31, 2018 (CN) .......................... 201811288029.9

(51) Int. Cl.
*H02K 1/14* (2006.01)
*H02K 1/2798* (2022.01)
(Continued)

(52) U.S. Cl.
CPC .......... *H02K 21/125* (2013.01); *H02K 1/2798* (2022.01); *H02K 21/24* (2013.01); *H02K 2201/12* (2013.01)

(58) Field of Classification Search
CPC ........ H02K 1/14; H02K 1/148; H02K 1/2793; H02K 21/24; H02K 21/125; H02K 2201/12
See application file for complete search history.

(56) References Cited

U.S. PATENT DOCUMENTS

| 4,605,874 A | * | 8/1986 | Whiteley | ............... H02K 21/24 310/156.32 |
| 6,087,746 A | * | 7/2000 | Couvert | ................. H02K 5/207 310/59 |

(Continued)

FOREIGN PATENT DOCUMENTS

| CN | 1539189 A | 10/2004 |
| CN | 1901323 A | 1/2007 |

(Continued)

OTHER PUBLICATIONS

Third Office Action dated Apr. 22, 2021 received in Chinese Patent Application No. CN 201811288026.5 together with an English language translation.

(Continued)

*Primary Examiner* — Dang D Le
(74) *Attorney, Agent, or Firm* — Scully, Scott, Murphy & Presser, P.C.

(57) ABSTRACT

The present disclosure provides a transverse magnetic flux motor having a stator and a rotor. The stator adopts a tooth and yoke separation structure. Multiple stator teeth are arranged at intervals along the circumferential direction of a stator yoke. The stator teeth or the stator yoke are wound with a stator winding. The rotor is provided on one side of the stator near the stator teeth in the axial direction, and has (Continued)

a back iron and multiple permanent magnets arranged in sequence along the circumferential direction. The permanent magnets are magnetized along the axial direction, and the polarities of adjacent permanent magnets are different from one another.

14 Claims, 8 Drawing Sheets

(51) Int. Cl.
*H02K 21/12* (2006.01)
*H02K 21/24* (2006.01)

(56) References Cited

U.S. PATENT DOCUMENTS

| | | | | |
|---|---|---|---|---|
| 6,211,595 | B1* | 4/2001 | Nose | G11B 19/2009 |
| | | | | 310/216.057 |
| 7,965,014 | B2* | 6/2011 | Shinagawa | H02K 1/148 |
| | | | | 310/216.113 |
| 8,653,714 | B2* | 2/2014 | Taniguchi | H02K 1/165 |
| | | | | 310/216.099 |
| 8,736,135 | B2* | 5/2014 | Asano | H02K 1/182 |
| | | | | 310/216.057 |
| 9,647,517 | B2* | 5/2017 | Kurosaki | H02K 15/022 |
| 2003/0057796 | A1 | 3/2003 | Fan et al. | |
| 2011/0037335 | A1 | 2/2011 | Jang et al. | |
| 2015/0244219 | A1* | 8/2015 | Woolmer | H02K 1/2793 |
| | | | | 310/156.32 |
| 2017/0250580 | A1* | 8/2017 | Rhyu | H02K 1/12 |

FOREIGN PATENT DOCUMENTS

| | | |
|---|---|---|
| CN | 1901324 A | 1/2007 |
| CN | 201904662 U | 7/2011 |
| CN | 202798178 U | 3/2013 |
| CN | 106130212 A | 11/2016 |
| CN | 106712325 A | 5/2017 |
| CN | 106712329 A | 5/2017 |
| CN | 109301948 A | 2/2019 |
| CN | 109302027 A | 2/2019 |
| EP | 0 429 729 A1 | 6/1991 |
| FR | 2 801 142 A1 | 5/2001 |
| JP | H08-265995 A | 10/1996 |
| JP | H10-271716 A | 10/1998 |
| JP | 2000-184631 A | 6/2000 |
| JP | 2000-232740 A | 8/2000 |
| JP | 2003-274583 A | 9/2003 |
| JP | 2006238623 A | 9/2006 |
| JP | 2006-304484 A | 11/2006 |
| JP | 4278997 B2 | 6/2009 |
| JP | 2012-023861 A | 2/2012 |
| WO | 01/34850 A2 | 5/2001 |

OTHER PUBLICATIONS

Third Office Action dated Apr. 22, 2021 received in Chinese Patent Application No. CN 201811288029.9 together with an English language translation.
Notification of the Fourth Office Action dated Aug. 16, 2021 received in Chinese Patent Application No. CN 201811288026.5 together with an English language translation.
Notification of the Fourth Office Action dated Aug. 16, 2021 received in Chinese Patent Application No. CN 201811288029.9 together with an English language translation.
First Office Action dated Dec. 26, 2019 received in Chinese Patent Application No. 201811288026.5 together with an English language translation.
First Office Action dated Dec. 26, 2019 received in Chinese Patent Application No. 201811288029.9 together with an English language translation.
International Search Report dated Feb. 6, 2020 received in International Application No. PCT/CN2019/114215 together with an English language translation.
Second Office Action dated Jul. 15, 2020 received in Chinese Patent Application No. 201811288026.5 together with an English language translation.
Second Office Action dated Jul. 15, 2020 received in Chinese Patent Application No. 201811288029.9 together with an English language translation.
Decision of Rejection dated Nov. 4, 2020 received in Chinese Patent Application No. CN 201811288026.5.
Decision of Rejection dated Jan. 28, 2022 received in Chinese Patent Application No. CN 201811288026.5.
Decision of Rejection dated Nov. 4, 2020 received in Chinese Patent Application No. CN 201811288029.9.
Decision of Rejection dated Jan. 28, 2022 received in Chinese Patent Application No. CN 201811288029.9.

* cited by examiner

TRANSVERSE MAGNETIC FLUX MOTOR

CROSS-REFERENCES TO RELATED APPLICATIONS

The present application is a continuation application of PCT International Application No. PCT/CN2019/114215, filed on Oct. 30, 2019, which claims the priority of Chinese Patent Application No. 201811288026.5, filed with the Chinese Patent Office on Oct. 31, 2018 and entitled "TRANSVERSE MAGNETIC FLUX MOTOR", and Chinese Patent Application No. 201811288029.9, filed with the Chinese Patent Office on Oct. 31, 2018 and entitled "TRANSVERSE MAGNETIC FLUX MOTOR", the entire contents of which are herein incorporated by reference for all purposes. No new matter has been introduced.

FIELD

The present disclosure relates to the field of motor technology, in particular, to a transverse magnetic flux motor.

BACKGROUND

With the gradual improvement of environmental protection awareness, motor efficiency is getting more and more attention. From the perspective of motor designing, the iron loss of the motor is determined by the strength of the magnetic induction, which is directly related to the width of the stator teeth; the copper loss of the motor is determined by the winding resistance, and is related to the groove width (area). For motors with traditional structures, groove width and tooth width are two variables that are mutually restricted. Under the premise of a fixed shape, both the iron loss and the copper loss cannot be optimized at the same time. However, the transverse magnetic flux motor is the orthogonal decoupling of the electric load and the magnetic load, there is no longer a restriction problem, and the efficiency of the motor can be greatly improved.

Although the transverse magnetic flux motor has the characteristics of electromagnetic decoupling and high efficiency, its magnetic circuit structure causes the stator punching sheet to be unable to be laminated in the axial direction to reduce eddy current loss, regardless of whether the stator core is laminated in the tangential direction or radial direction, and there are problems such as complex punching process and difficulty in winding, which restricts the engineering promotion of transverse magnetic flux permanent magnet motors.

SUMMARY

The present disclosure aims to solve at least one of the above-mentioned technical problems.

To this end, the first purpose of the present disclosure is to provide a transverse magnetic flux motor.

The second purpose of the present disclosure is to provide another transverse magnetic flux motor.

In order to achieve the above purposes, according to the embodiment of the first aspect of the present disclosure, a transverse magnetic flux motor is provided, comprising: a stator, comprising a stator yoke and a plurality of stator teeth arranged at intervals along a circumferential direction of the stator yoke, the stator yoke being composed of a plurality of stator yoke punching sheets laminated in an axial direction, and each of the stator teeth being composed of a plurality of stator yoke punching sheets with same shape laminated in a radial direction, a plurality of the stator teeth being fixed on one side of the stator yoke in the axial direction, and a stator winding being provided on the stator teeth or the stator yoke; and a rotor, arranged on one side of the stator near the stator teeth in the axial direction, the rotor comprising a back iron and a plurality of permanent magnets arranged in sequence along the circumferential direction, the permanent magnet being magnetized along the axial direction, and polarities of adjacent permanent magnets being different.

In the transverse magnetic flux motor provided by the above-mentioned embodiment of the present disclosure, the lamination direction of the stator teeth is orthogonal to the lamination direction of the stator yoke, and the magnetic field direction of the stator teeth is distributed in the radial direction and parallel to the stator teeth of the radial lamination, the direction of the magnetic field of the stator yoke is distributed along the axial direction, and parallel to the stator yoke of the axial lamination. The magnetic field loop generated by the permanent magnet of the rotor flows through: one permanent magnet→the air gap between the permanent magnet and the stator teeth→one stator teeth→stator yoke→another stator teeth→the air gap between the stator teeth and the permanent magnet→another permanent magnet→back iron, thus forming a transverse magnetic circuit structure, realizing the electrical and magnetic decoupling of the motor, and the groove area is no longer restricted by the magnetic load. The stator adopts a tooth and yoke separation structure, the stator teeth are laminated in the radial direction, which can greatly improve the manufacturability of the transverse magnetic flux motor. The shape of each of stator teeth punching sheet of the stator teeth laminated in the radial direction is the same, which greatly reduces the complexity of the punching process, and the efficiency of mass manufacturing is guaranteed. The stator yoke laminated in the axial direction greatly improves the manufacturability of the transverse magnetic flux motor while increasing the power density of the motor. Compared with the existing transverse magnetic flux motor, the structure performance of the motor using this separated stator and yoke can be improved by about 13%, so as to achieve the effect of not only simplifying the production process of the motor, but also increasing the power density of the motor.

In addition, the transverse magnetic flux motor provided in the above-mentioned embodiment of the present disclosure may also have the following additional technical features.

In an embodiment, the number of the stator winding is multiple, and the multiple stator windings are wound on the multiple stator teeth in a one-to-one correspondence.

In this embodiment, the stator winding is wound on the stator teeth, which makes the winding of the stator winding more convenient, and compared with the stator winding on the stator yoke, it is beneficial to reduce the axial size of the motor; the stator winding can comprise an insulating frame and winding coils wound on the insulating frame to isolate the winding coils from the stator teeth by the insulating frame to provide insulation.

In another embodiment, the number of the stator winding is multiple, and the multiple stator windings are wound on the stator yoke located between the adjacent stator teeth in a one-to-one correspondence.

Winding the stator winding on the stator yoke can also form a transverse magnetic circuit, realizing the electrical and magnetic decoupling of the motor, and the groove area is no longer restricted by the magnetic load.

In an embodiment, the stator yoke is provided with open slots equal to the number of the stator teeth, and one end of each of the stator teeth along the axial direction is correspondingly inserted into the open slot.

The stator teeth and the stator yoke adopt this plug-in connection structure, which makes the assembly operation of the stator teeth and the stator yoke simple, and the assembly is firm; the mechanical coordination method of the stator teeth and the stator yoke can be an interference fit or a welding fixation, etc. It can realize the firm assembly of stator teeth and stator yoke.

In an embodiment, the stator yoke has a substantial ring shape, and the open slot is opened on the inner side of the stator yoke and extends along the radial direction of the stator yoke to the outer side of the stator yoke. Thereby the open slot is used to realize the fixation of multiple stator teeth on the stator yoke at intervals in the circumferential direction, and to ensure that the stacking direction of the stator teeth punching sheet of each of the stator teeth is along the radial direction.

In an embodiment, the stator teeth comprise teeth extending in the axial direction and a teeth boot connected to one end of the teeth in the axial direction, the teeth boot extends in a direction perpendicular to the axial direction, and two ends of the teeth boot extend out of the teeth, so that the stator teeth are in a T shape, and another end of the teeth along the axial direction is inserted into the open slot.

For example, the teeth extending in the axial direction have a shorter size perpendicular to the axial direction (that is, along the tangential direction), and the teeth are used for winding the stator winding to leave enough space for the winding. And the teeth are used to conduct magnetism to form a magnetic circuit; the teeth boot extending in the direction perpendicular to the axial direction has a longer size in the direction perpendicular to the axial direction (that is, along the tangential direction), and the teeth boot can collect the magnetic flux from the rotor, which has a good magnetization effect, thereby increasing the performance output of the motor.

In an embodiment, the stator yoke punching sheet is formed by bending a strip-shaped punching sheet, and the strip-shaped punching sheet is provided with groove, after the strip-shaped punching sheet is rounded, the groove area of the groove is reduced, and the shape and size of the reduced groove are adapted to the cross-sectional shape and size of the one end of the stator teeth in the axial direction.

The stator yoke punching sheet formed by bending a strip-shaped punching sheet can reduce intermediate waste compared with a round punching sheet, thereby increasing the utilization rate of punching sheet materials and facilitating reduction of material costs. The shape and size of the slot on the strip-shaped punching sheet can be reasonably configured according to the actual situation. For example, if a rectangular open slot needs to be formed after being rounded, a trapezoidal slot with a relatively wide opening on the strip-shaped punching sheet can be configured, and the width of the opening is reduced after rounding, forming a rectangular open slot with the same opening width as the bottom of the slot.

In an embodiment, the stator yoke punching sheet is formed by punching a circular punching sheet, and the open slot is a tooth groove set on the lamination plane of the stator yoke, which makes the processing of the stator yoke punching sheet convenient and low manufacturing cost.

In an embodiment, the stator yoke is formed by assembling a plurality of stator yoke devices along the circumferential direction, and a gap is left between adjacent stator yoke devices to form the open slot, or the open slot is provided on the stator yoke device.

This reduces the length of the punching sheet that composes each of the stator yoke devices, which facilitates the smooth stacking of each of the stator yoke devices.

In another embodiment, the stator comprises a stator housing, and an integrated structure formed by the stator teeth, the stator yoke and the stator winding is plastic-encapsulated in the stator housing.

The stator assembly containing the stator teeth, the stator yoke, and the stator winding is wrapped by a filling material, and the stator assembly is plastic-encapsulated in the stator housing, the filling material can be a mass molding compound.

In order to achieve the above-mentioned purposes, according to the embodiment of the second aspect of the present disclosure, a transverse magnetic flux motor is provided, comprising: a stator, adopting a tooth and yoke separation structure, comprising a stator yoke, a plurality of first stator teeth and a plurality of second stator teeth, and a plurality of the first stator teeth and a plurality of the second stator teeth being arranged at intervals along a circumferential direction of the stator yoke and being relatively fixed on two sides of the stator yoke in an axial direction, and the stator yoke being composed of a plurality of stator yoke punching sheets laminated in the axial direction, each of the first stator teeth and each of the second stator teeth being composed of a plurality of stator teeth punching sheets with same shape laminated in a radial direction; and a first rotor and a second rotor, being separately arranged on two sides of the stator in the axial direction, the first rotor comprising a first back iron and a plurality of first permanent magnets arranged in sequence along the circumferential direction, and the first permanent magnet being magnetized along the axial direction, and polarities of the adjacent first permanent magnets are different, the second rotor comprises a second back iron and a plurality of second permanent magnets arranged in sequence along the circumferential direction, the second permanent magnet is magnetized along the axial direction, the polarities of the adjacent second permanent magnets are different, and the first permanent magnet and the second permanent magnet are mirror-symmetrical, and symmetry surfaces of the first permanent magnet and the second permanent magnet at the same axial position have same polarity.

The transverse magnetic flux motor provided by the above-mentioned embodiment of the present disclosure realizes the electrical and magnetic decoupling of the motor by configuring the transverse magnetic circuit structure, and the groove area is no longer restricted by the magnetic load. The stator adopts a tooth and yoke separation structure. The first stator teeth and the second stator teeth are laminated in the radial direction, which can greatly improve the manufacturability of the transverse magnetic flux motor. Each of the stator teeth punching sheets of the first stator teeth and the second stator teeth laminated in the radial direction has the same shape, which greatly reduces the complexity of the punching sheet process and ensures the efficiency of mass manufacturing. The stator yoke laminated in the axial direction greatly improves the manufacturability of the transverse magnetic flux motor and at the same time increases the power density of the motor. Compared with the existing transverse magnetic flux motor, the structure performance of the motor using this separated stator and yoke can be increased by about 13%. By configuring two rotors and the polarities of the two permanent magnets corresponding to the two permanent magnets in the axial direction of the two motors are the same, and the magnetic flux is concentrated through the shared stator yoke, the power density of the existing motors can be greatly improved. On the basis of the motor structure of the above-mentioned separated stator yoke, the structure performance of the magnetic-concentrating transverse magnetic flux motor configured by this solution can be improved by about 17%, so as to achieve the effect of not only simplifying the production process of the motor, but also increasing the power density of the motor.

For example, the lamination direction of the first stator teeth and the second stator teeth are orthogonal to the lamination direction of the stator yoke, and the magnetic field directions of the first stator teeth and the second stator teeth are distributed along the radial direction, and parallel to the first stator teeth and the second stator teeth of the radial lamination, the magnetic field direction of the stator yoke is distributed along the tangential direction, and parallel to the stator yoke of the axial lamination. The magnetic fields formed by two permanent magnets with the same polarity in the axial direction enter the stator teeth through the air gap, and the magnetic fields of the axially opposite stator teeth have different directions. The magnetic fields generated by the two opposite permanent magnets in the axial direction share the stator yoke connection, that is, they are summarized by the stator yoke, and are connected with the stator winding turns, and through the stator teeth on two sides, and finally form a magnetic circuit with the opposite permanent magnets on the same surface in the axial direction. The magnetic field loop generated by the first permanent magnet of the first rotor flows through: one first permanent magnet→the air gap between the first permanent magnet and the first stator teeth→one first stator teeth→the shared stator yoke→another first stator tooth→the air gap between the first stator teeth and the first permanent magnet→another first permanent magnet→the first back iron. The magnetic field loop generated by the second permanent magnet of the second rotor, which is axially opposite to the first permanent magnet of the above-mentioned first rotor, flows through: one second permanent magnet→the air gap between the second permanent magnet and the second stator teeth→one second stator teeth→the shared stator yoke→another second stator teeth→the air gap between the second stator teeth and the second permanent magnet→another second permanent magnet→the second back iron. Magnetic flux concentration through a shared stator yoke can greatly increase the power density of the motor compared with the solution of setting one rotor, thereby improving the structural performance of the transverse magnetic flux motor.

In addition, the transverse magnetic flux motor provided in the above-mentioned embodiment of the present disclosure may also have the following additional technical features.

In an embodiment, the stator comprises a stator winding, the stator winding comprises a first stator winding and a second stator winding, each of the first stator teeth is wound with the first stator winding, and each of the second stator teeth is wound with the second stator winding.

Winding the first stator winding and the second stator winding on the first stator teeth and the second stator teeth correspondingly to make the winding of the first stator winding and the second stator winding more convenient. Compared with the stator winding wound on the stator yoke, it is beneficial to reduce the axial size of the motor; the first stator winding and the second stator winding can both comprise an insulating frame and winding coils wound on the insulating frame to use the insulating frame to isolate the winding coil from the first stator teeth or the winding coil from the second stator teeth to provide insulation.

In an embodiment, the stator comprises a stator winding, and the stator winding is wound on the stator yoke located between the adjacent first stator teeth.

Winding the stator winding on the stator yoke can also form a transverse magnetic circuit to achieve electrical and magnetic decoupling of the motor, and the groove area is no longer restricted by the magnetic load.

In an embodiment, the stator yoke is provided with open slots equal to the number of the first stator teeth, one end of the first stator teeth facing the second stator teeth and one end of the second stator teeth facing the first stator teeth oppositely inserted into the open slots in the axial direction.

The first stator teeth and the stator yoke, the second stator teeth and the stator yoke all adopt this plug-in connection structure, which makes the assembly operation of the first stator teeth and the stator yoke, the second stator teeth and the stator yoke simple and firm. The mechanical cooperation between the first stator teeth and the stator yoke, the second stator teeth and the stator yoke can be interference fit or welding fixing, etc., all of which can be firmly assembled.

In an embodiment, the stator yoke is in a substantial shape, the open slot is opened on an inner side of the stator yoke and extends along the radial direction of the stator yoke to an outer side of the stator yoke, and the open slot penetrates the stator yoke along the axial direction.

In the above-mentioned embodiments, multiple first stator teeth and multiple second stator teeth are fixed on the stator yoke at intervals along the circumferential direction by using the open slots, and multiple first stator teeth and multiple second stator teeth are fixed on two sides of the stator yoke along the axial direction, and ensure that the stacking direction of the stator teeth punching sheet of each of the first stator teeth and each of the second stator teeth is along the radial direction.

In an embodiment, the first stator teeth comprise a first teeth extending in the axial direction and a first teeth boot connected to one end of the first teeth in the axial direction, the first teeth boot extending in a direction perpendicular to the axial direction, and two ends of the first teeth boot extend out of the first teeth, so that the first stator teeth are in a T shape, and another end of the first teeth along the axial direction is inserted into the open slot, the second stator teeth comprise a second teeth extending in the axial direction and a second teeth boot connected to one end of the second teeth in the axial direction, the second teeth boot extending in a direction perpendicular to the axial direction, and two ends of the second teeth boot extend out of the second teeth, so that the second stator teeth are in a T shape, and another end of the second teeth along the axial direction is inserted into the open slot.

For example, the first teeth and the second teeth extending in the axial direction have a shorter size perpendicular to the axial direction (that is, along the tangential direction), and the first teeth and the second teeth are used for winding the stator winding to leave enough space for the winding. And the first teeth and the second teeth are used to conduct magnetism to form a magnetic circuit; the first teeth boot and the second teeth boot extending in the direction perpendicular to the axial direction have a longer size in the direction perpendicular to the axial direction (that is, along the tangential direction), the first teeth boot and the second teeth boot can collect the magnetic flux from the rotor, which has a good magnetizing effect, thereby increasing the performance output of the motor.

In an embodiment, the stator yoke punching sheet is formed by bending a strip-shaped punching sheet, the strip-shaped punching sheet is provided with groove, and after the strip-shaped punching sheet is rounded, the groove area of the groove is reduced, and the shape and size of the reduced groove are adapted to the cross-sectional shape and size of one end of the first stator teeth facing the second stator teeth and one end of the second stator teeth facing the first stator teeth.

The stator yoke punching sheet formed by bending the strip-shaped punching sheet. Compared with the round punching sheet, the intermediate waste can be reduced, thereby improving the utilization rate of the punching sheet material, and facilitating reduction of material costs. The shape and size of the slot on the strip-shaped punching sheet can be configured reasonably according to the actual situation. For example, if a rectangular open slot needs to be formed after being rounded, a trapezoidal slot with a relatively wide opening on the strip-shaped punching sheet can be configured, and the width of the opening is reduced after rounding, forming a rectangular open slot with the same opening width as the bottom of the slot.

In an embodiment, the stator yoke punching sheet is formed by punching a circular punching sheet, and the open slot is a tooth groove provided on the lamination plane of the stator yoke, which makes the processing of the stator yoke punching sheet convenient and low manufacturing cost.

In an embodiment, the stator yoke is formed by assembling a plurality of stator yoke devices along the circumferential direction, and a gap is left between the adjacent stator yoke devices to form the open slot, or the open slot is provided on the stator yoke device. This reduces the length of the punching sheet that composes each of the stator yoke devices, which facilitates the smooth stacking of each of the stator yoke devices.

In an embodiment, the stator comprises a stator housing, and an integrated structure formed by the first stator teeth, the second stator teeth, the stator yoke and the stator winding is plastic-encapsulated in the stator housing.

The stator assembly containing the stator teeth, the stator yoke, and the stator winding is wrapped by a filling material, and the stator assembly is plastic-encapsulated in the stator housing, the filling material can be a mass molding compound.

Additional aspects and advantages of the present disclosure will become apparent in the following description, or are understood by the practice of the present disclosure.

BRIEF DESCRIPTION OF THE DRAWINGS

The above and/or additional aspects and advantages of the present disclosure will become apparent and readily understood from the following description of embodiments in conjunction with the drawings.

Figure 1:
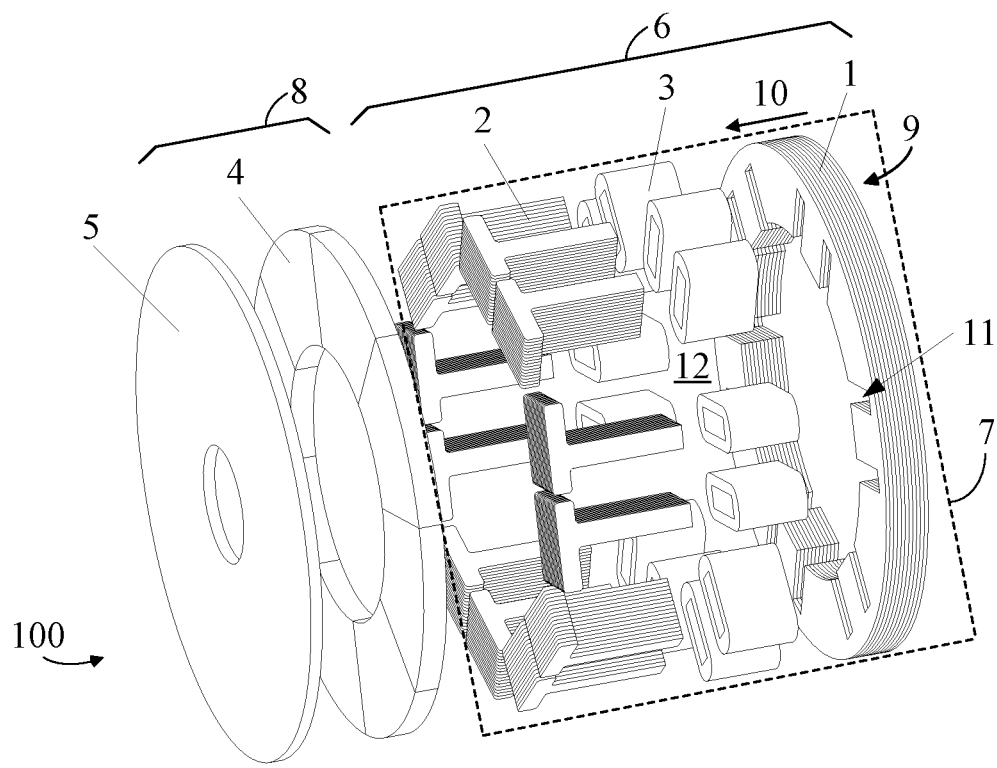
FIG. 1 is a schematic diagram of decomposition structure of a transverse magnetic flux motor of an embodiment of the present disclosure.

Wherein, the corresponding relationship between the reference signs and component names in FIG. 1 to FIG. 14 is as follows:

1 stator yoke, 11 open slot, 12 filling material, 12$a$ filling material, 2 stator teeth, 2$a$ first stator teeth, 2$b$ second stator teeth, 21 teeth, 21$a$ first teeth, 21$b$ second teeth, 22 teeth boot, 22$a$ first teeth boot, 22$b$ second teeth boot, 3 stator winding, 3$a$ first stator winding, 3$b$ second stator winding, 4 permanent magnet, 4$a$ first permanent magnet, 4$b$ second permanent magnet, 5 back iron, 5$a$ first back iron, 5$b$ second back iron, stator 6, stator 6$a$, stator housing 7, stator housing 7$a$, rotor 8, first rotor 8$a$, second rotor 8$b$, stator yoke punching sheets 9, axial direction 10, transverse magnetic flux motor 100, and transverse magnetic flux motor 200.

DETAILED DESCRIPTION OF EMBODIMENTS

In order that the above-mentioned objectives, features, and advantages of the present disclosure can be understood more clearly, a further detailed description of the present disclosure will be given below in connection with the accompanying drawings and exemplary embodiments. It should be noted that the embodiments of the present disclosure and the features in the embodiments can be combined with each other if there is no conflict.

In the following description, numerous details are set forth in order to provide a thorough understanding of the present disclosure. However, the present disclosure may also be implemented in other manners than those described herein. Therefore, the protection scope of the present disclosure is not limited to the exemplary embodiments disclosed below.

The following describes a transverse magnetic flux motor provided according to some embodiments of the present disclosure with reference to FIGS. 1 to 12.

As shown in FIGS. 1 to 5, a transverse magnetic flux motor 100 provided according to some embodiments of the present disclosure comprises: a stator 6 and a rotor 8.

Figure 2:
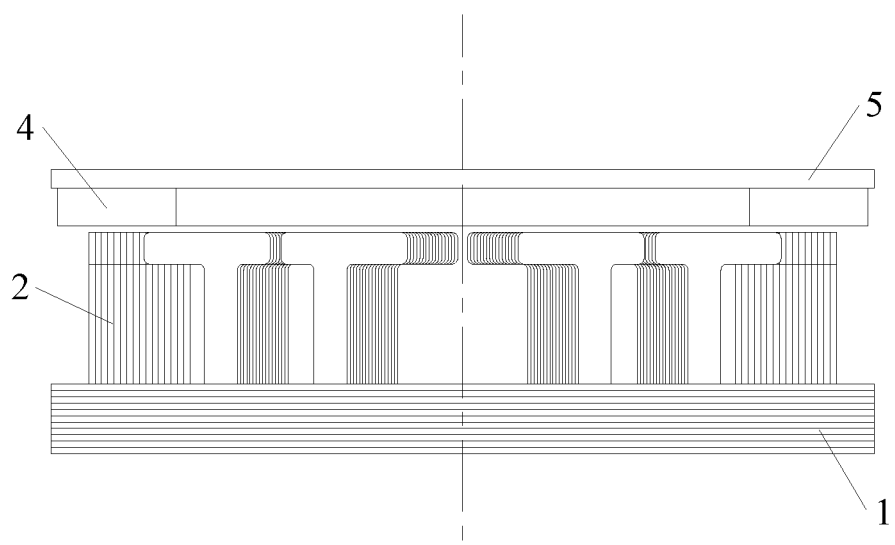
FIG. 2 is a schematic diagram of assembly structure of a transverse magnetic flux motor of an embodiment shown in FIG. 1.

For example, as shown in FIGS. 1 and 2, the stator adopts a tooth and yoke separation structure. The stator 6 comprises a stator yoke 1 and a plurality of stator teeth 2 arranged at intervals along the circumferential direction of the stator yoke 1. The stator yoke 1 includes and can be made of a plurality of stator yoke punching sheets 9 laminated in the axial direction 10, and each of the stator teeth 2 includes and can be made of a plurality of stator teeth punching sheets with same shape laminated in a radial direction. The plurality of stator teeth 2 are fixed on one side of the stator yoke 1 in the axial direction, and a stator winding 3 is provided on the stator teeth 2 or the stator yoke 1. A rotor 8 is arranged on one side of the stator near the stator teeth 2 in the axial direction, and the rotor includes a back iron 5 and a plurality of permanent magnets 4 arranged in sequence along the circumferential direction. The permanent magnet 4 is magnetized along the axial direction, and polarities of adjacent permanent magnets 4 are different from one another. The back iron 5 is arranged on one side of the permanent magnet 4, facing away from the stator teeth 2 in the axial direction.

It should be noted that the "circumferential", "axial" and "radial" here refer to the circumferential direction of the stator yoke, the axial direction of the stator yoke, and the radial direction of the stator yoke, which is the same as the definition of "circumferential", "axial" and "radial" of the conventional motor stator yoke.

In the transverse magnetic flux motor provided by the above-mentioned embodiment of the present disclosure, the lamination direction of the stator teeth 2 is orthogonal to the lamination direction of the stator yoke 1, that is, the lamination direction of stator teeth 2 is orthogonal to the lamination direction of stator yoke 1. The magnetic field direction of the stator teeth 2 is distributed in the radial direction and parallel to the stator teeth 2 of the radial lamination. The direction of the magnetic field of the stator yoke 1 is distributed along the axial direction, and parallel to the stator yoke 1 of the axial lamination. As shown by the arrow in FIG. 5, the magnetic field loop generated by the permanent magnet 4 of the rotor flows through: one permanent magnet 4→the air gap between the permanent magnet 4 and the stator teeth 2→one stator teeth 2→stator yoke 1→another stator teeth 2→the air gap between the stator teeth 2 and the permanent magnet 4→another permanent magnet 4→back iron 5, thus forming a transverse magnetic circuit structure, realizing the electrical and magnetic decoupling of the motor, and the groove area is no longer restricted by the magnetic load. The stator adopts a tooth and yoke separation structure, the stator teeth 2 are laminated in the radial direction, which can greatly improve the manufacturability of the transverse magnetic flux motor. The shape of each of stator teeth punching sheets of the stator teeth 2 laminated in the radial direction is the same, which greatly reduces the complexity of the punching process, and the efficiency of mass manufacturing is guaranteed. The stator yoke 1 laminated in the axial direction greatly improves the manufacturability of the transverse magnetic flux motor while increasing the power density of the motor. Compared with the existing transverse magnetic flux motor, the structure performance of the motor using this separated stator and yoke can be improved by about 13%, so as to achieve the effect of not only simplifying the production process of the motor, but also increasing the power density of the motor.

Further, as shown in FIG. 1, the number of the stator winding 3 is multiple, and the multiple stator windings 3 are wound on the multiple stator teeth 2 in a one-to-one correspondence. The stator winding 3 is wound on the stator teeth 2, which makes the winding of the stator winding 3 more convenient, and compared with the stator winding 3 on the stator yoke 1, it is beneficial to reduce the axial size of the motor; for example, the stator winding 3 can comprise an insulating frame and winding coils wound on the insulating frame to isolate the winding coils from the stator teeth 2 by the insulating frame to provide insulation.

Further, the number of the stator winding 3 is multiple, and the multiple stator windings 3 are wound on the stator yoke 1 located between the adjacent stator teeth 2 in a one-to-one correspondence. That is, the stator winding 3 can also be wound on the stator yoke 1 can also form a transverse magnetic circuit, realizing the electrical and magnetic decoupling of the motor, and the groove area is no longer restricted by the magnetic load.

Figure 3:
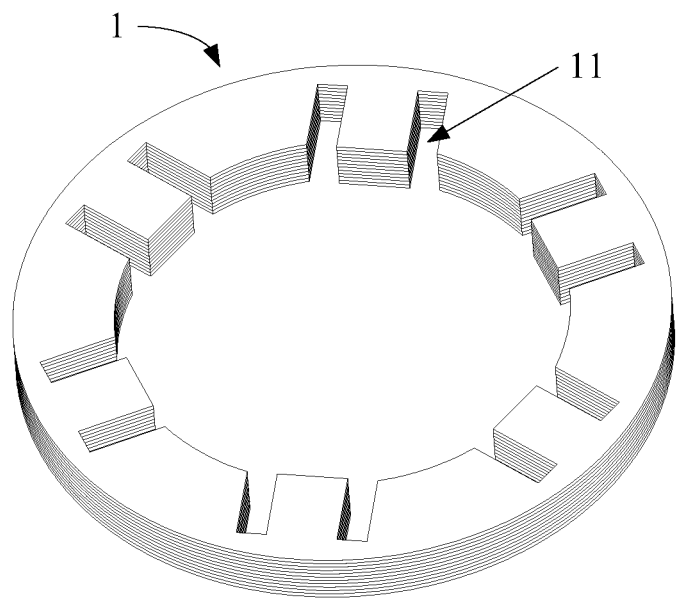
FIG. 3 is a structural schematic diagram of a stator yoke of a transverse magnetic flux motor of an embodiment shown in FIG. 1.

In some embodiment of the present disclosure, as shown in FIGS. 1 and 3, the stator yoke 1 is provided with open slots 11 equal to the number of the stator teeth 2, and one end of each of the stator teeth 2 along the axial direction is correspondingly inserted into the open slot 11. The stator teeth 2 and the stator yoke 1 adopt this plug-in connection structure, which makes the assembly operation of the stator teeth 2 and the stator yoke 1 simple, and the assembly is firm. The mechanical coordination method of the stator teeth 2 and the stator yoke 1 can be an interference fit or a welding fixation, etc. It can realize the firm assembly of stator teeth 2 and stator yoke 1.

Further, as shown in FIGS. 1 and 3, the stator yoke 1 has a substantial ring shape, and the open slot 11 is opened on the inner side of the stator yoke 1 and extends along the radial direction of the stator yoke 1 to the outer side of the stator yoke 1. Thus, the open slot 11 is used to realize the fixation of multiple stator teeth 2 on the stator yoke 1 at intervals in the circumferential direction, and to ensure that the stacking direction of the stator teeth 2 punching sheet of each of the stator teeth is along the radial direction.

Figure 4:
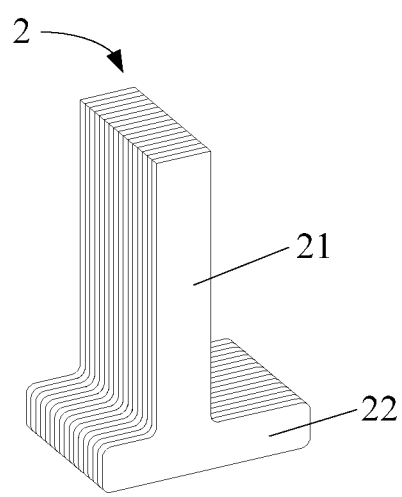
FIG. 4 is a structural schematic diagram of a stator teeth of a transverse magnetic flux motor of an embodiment shown in FIG. 1.
Figure 5:
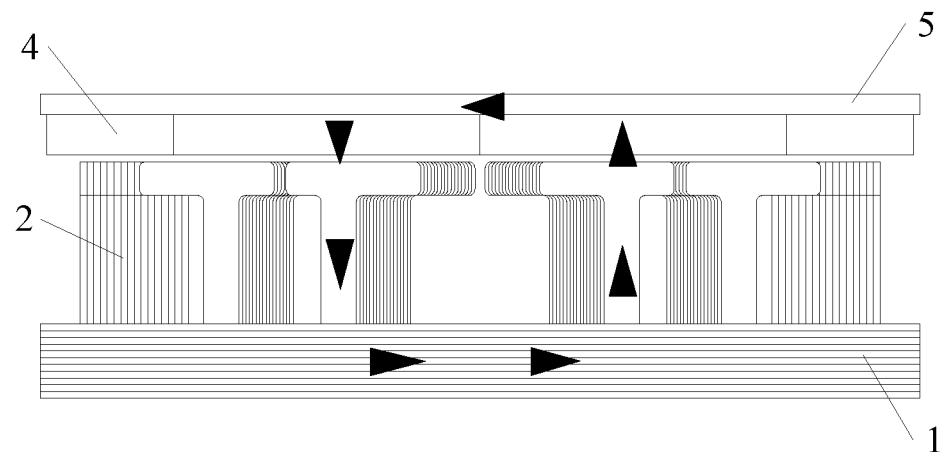
FIG. 5 is a schematic diagram of a magnetic flux circuit of a transverse magnetic flux motor of an embodiment shown in FIG. 1, and an arrow in the figure indicates the direction of the magnetic circuit.

Further, shown in FIGS. 1, 2 and 4, the stator teeth 2 comprise teeth 21 extending in the axial direction and a teeth boot 22 connected to one end of the teeth 21 in the axial direction, the teeth boot 22 extends in a direction perpendicular to the axial direction, and two ends of the teeth boot 22 extend out of the teeth 21, so that the stator teeth 2 are in a T shape, and another end (that is, one end of the teeth 21 away from the teeth boot 22) of the teeth 21 along the axial direction is inserted into the open slot 11.

For example, the teeth 21 extending in the axial direction have a shorter size perpendicular to the axial direction (that is, along the tangential direction), and the teeth 21 are used for winding the stator winding 3 to leave enough space for the winding. The teeth 21 are used to conduct magnetism to form a magnetic circuit. The teeth boot 22 extending in the direction perpendicular to the axial direction has a longer size in the direction perpendicular to the axial direction (that is, along the tangential direction), and the teeth boot 22 can collect the magnetic flux from the rotor, which has an improved magnetization effect, thereby increasing the performance output of the motor.

Figure 13:
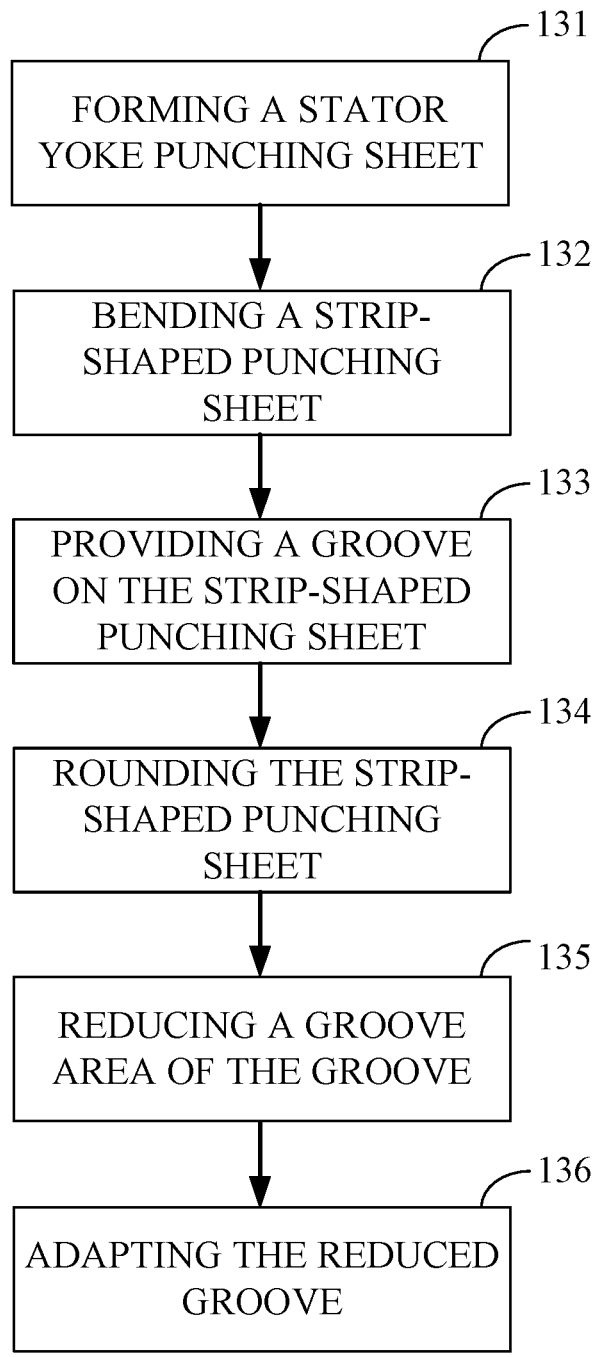
FIG. 13 is a flow diagram illustrating an embodiment.

In an embodiment of the present disclosure, as shown in FIG. 3 and FIG. 13, the stator yoke punching sheet is formed 131 by bending 132 a strip-shaped punching sheet, and the strip-shaped punching sheet is provided 133 with a groove. After the strip-shaped punching sheet is rounded 134, the groove area of the groove is reduced 135, and the shape and size of the reduced groove are adapted 136 to the cross-sectional shape and size of the one end of the stator teeth 2 in the axial direction.

The stator yoke punching sheet formed by bending a strip-shaped punching sheet can reduce intermediate waste compared with a round punching sheet, thereby increasing the utilization rate of punching sheet materials and facilitating reduction of material costs. The shape and size of the slot on the strip-shaped punching sheet can be reasonably configured according to the actual situation. For example, if a rectangular open slot 11 needs to be formed after being rounded, a trapezoidal slot with a relatively wide opening on the strip-shaped punching sheet can be configured, and the width of the opening is reduced after rounding, forming a rectangular open slot 11 with the same opening width as the bottom of the slot. Further, after the strip-shaped punching sheet is rounded, the groove area of the groove is equal to the axial cross-sectional area of the tooth tops (that is, one end of the stator teeth 2 inserting and fitting with the stator yoke 1) of the stator teeth 2.

For example, the stator yoke 1 is formed by stacking multiple strip-shaped punching sheet after being rounded, and each of the strip-shaped punching sheets has the same shape, and the slots are opened on each of the strip-shaped punching sheets, and the number of slots in the annular stator yoke punching sheet formed by stacking is equal to the number of stator teeth 2 of the transverse magnetic flux motor. After the strip-shaped punching sheet is rounded, the groove area of the groove becomes smaller, and the groove area is equal to the axial cross-sectional area of the tooth top of the stator teeth 2. Each of the stacked stator teeth 2 is placed in the open slot 11 of the stator yoke 1 formed after being rounded and stacked.

In another embodiment of the present disclosure, the stator yoke punching sheet is formed by punching a circular punching sheet, and the open slot is a tooth groove set on the lamination plane of the stator yoke. Further, the groove area of the tooth groove is equal to the axial cross-sectional area of the tooth top (that is, one end of the stator teeth 2 inserting and fitting with the stator yoke 1) of the stator teeth 2, which makes the processing of the stator yoke punching sheet convenient and low manufacturing cost.

Figure 14:
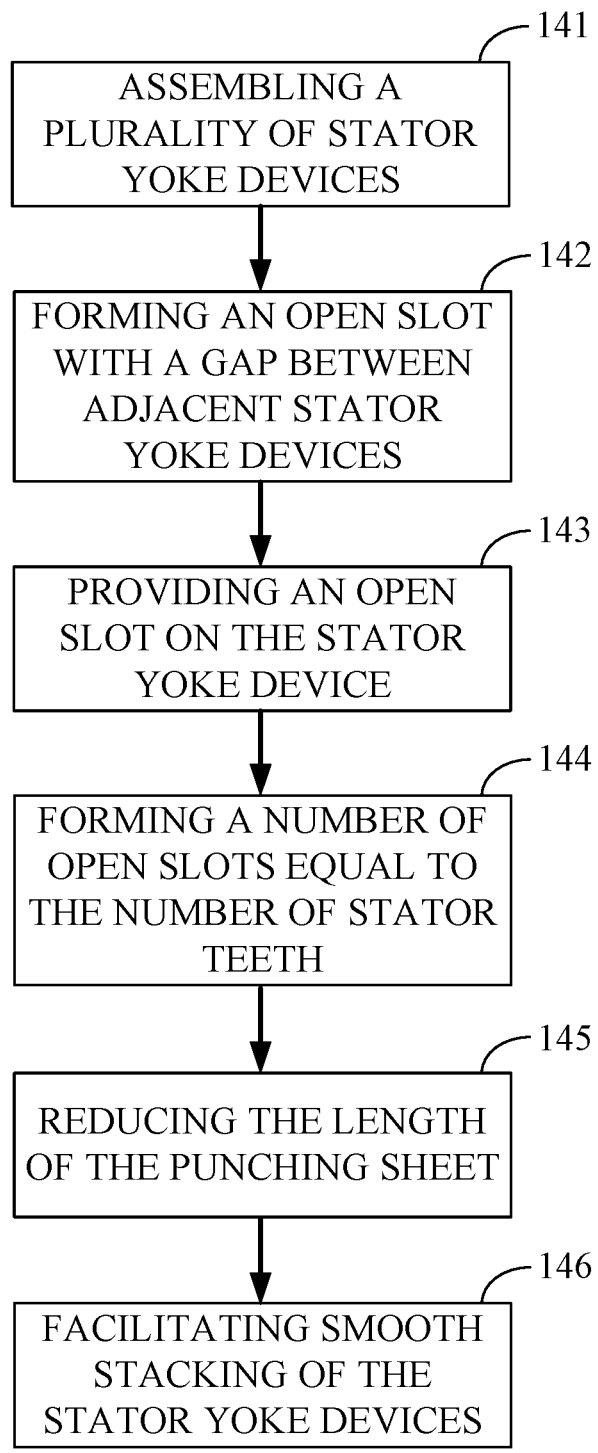
FIG. 14 is a flow diagram illustrating an embodiment.

In yet another embodiment of the present disclosure, as shown in FIG. 14, the stator yoke 1 is formed by assembling 141 a plurality of stator yoke devices along the circumferential direction, and a gap is left between adjacent stator yoke devices to form 142 the open slot 11, or the open slot 11 is provided 143 on the stator yoke device. After the assembly is completed, the number of the open slots 11 formed 144 on stator yoke 1 is equal to the number of stator teeth 2. This reduces 145 the length of the punching sheet that composes each of the stator yoke devices, which facilitates 146 the smooth stacking of each of the stator yoke devices.

Further, a stator 6 comprises a stator housing 7. An integrated structure formed by the stator teeth 2, the stator yoke 1 and the stator winding 3 is plastic-encapsulated in the stator housing. For example, a stator assembly containing the stator teeth 2, the stator yoke 1, and the stator winding 3 is wrapped by a filling material 12, and the stator assembly is plastic-encapsulated in the stator housing, the filling material can be a mass molding compound.

In summary, the transverse magnetic flux motor provided by an embodiment of the present disclosure can not only simplify the production process of the motor, but also increase the power density of the motor. Through the configuration of the transverse magnetic circuit structure, the electrical and magnetic decoupling of the motor is realized, and the groove area is no longer restricted by the magnetic load. By stacking the stator teeth in the radial direction, the manufacturability of the transverse magnetic flux motor can be greatly improved. The shape of each of the stator teeth punching sheets of the stator teeth stacked in the radial direction is the same, ensuring the efficiency of mass production. Through the separated yoke part laminated in the axial direction, the manufacturability of the transverse magnetic flux motor is greatly improved, and at the same time the power density of the motor is increased. Compared with the existing transverse magnetic flux motor, the structure performance of the motor using this separated yoke part is improved by about 13%.

As shown in FIGS. 6 to 12, according to a transverse magnetic flux motor 200 provided by some embodiments of the present disclosure, comprising: a stator 6a, a first rotor 8a and a second rotor 8b.

For example, as shown in FIGS. 6 to 9, the stator adopts a tooth and yoke separation structure, comprising a stator yoke 1, a plurality of first stator teeth 2a and a plurality of second stator teeth 2b. The plurality of first stator teeth 2a and the plurality of second stator teeth 2b are arranged at intervals along a circumferential direction of the stator yoke 1 and are oppositely fixed on two sides of the stator yoke 1 in an axial direction. The stator yoke 1 includes a plurality of stator yoke punching sheets laminated in the axial direction, and each of the first stator teeth 2a and each of the second stator teeth 2b include a plurality of stator teeth punching sheets with same shape laminated in a radial direction.

The first rotor 8a and the second rotor 8b are coaxially connected, and the first rotor and the second rotor are separately arranged on two sides of the stator 6a in the axial direction. The first rotor 8a includes a first back iron 5a and a plurality of first permanent magnets 4a arranged on the first back iron 5a in sequence along the circumferential direction. The first back iron 5a is arranged on one side of the first permanent magnet 4a facing away from the first stator teeth 2a in the axial direction. The first permanent magnet 4a is magnetized along the axial direction, and polarities of adjacent first permanent magnets 4a are different from each other. The second rotor 8b comprises a second back iron 5b and a plurality of second permanent magnets 4b arranged on the second back iron 5b in sequence along the circumferential direction. The second back iron 5b is arranged on one side of the second permanent magnet 4b facing away from the second stator teeth 2b in the axial direction. The second permanent magnet 4b is magnetized along the axial direction, the polarities of the adjacent second permanent magnets 4b are different from one another. The first permanent magnet 4a and the second permanent magnet 4b are mirror symmetrical. The symmetry surfaces of the first permanent magnet 4a and the second permanent magnet 4b at the same axial position, which symmetry surfaces faces each other in the axial direction, have the same polarity. Stated differently, the polarities of the first permanent magnet 4a and the second permanent magnet 4b at the same axial position are different from each other.

It should be noted that the "circumferential", "axial" and "radial" here refer to the circumferential direction of the stator yoke, the axial direction of the stator yoke, and the radial direction of the stator yoke, which is the same as the definition of "circumferential", "axial" and "radial" of the conventional motor stator yoke.

The transverse magnetic flux motor provided by the above-mentioned embodiment of the present disclosure realizes the electrical and magnetic decoupling of the motor by configuring the transverse magnetic circuit structure, and the groove area is no longer restricted by the magnetic load. The stator adopts a tooth and yoke separation structure. The first stator teeth 2a and the second stator teeth 2b are laminated in the radial direction, which can greatly improve the manufacturability of the transverse magnetic flux motor. Each of the stator teeth punching sheets of the first stator teeth 2a and the second stator teeth 2b laminated in the radial direction has the same shape, which greatly reduces the complexity of the punching sheet process and ensures the efficiency of mass manufacturing. The stator yoke 1 laminated in the axial direction greatly improves the manufacturability of the transverse magnetic flux motor and at the same time increases the power density of the motor. Compared with the existing transverse magnetic flux motor, the structure performance of the motor using this separated stator and yoke can be increased by about 13%. By configuring two rotors and the polarities of the two permanent magnets corresponding to the two permanent magnets in the axial direction of the two motors are the same, and the magnetic flux is concentrated through the shared stator yoke 1, the power density of the existing motors can be greatly improved. On the basis of the motor structure of the above-mentioned separated stator yoke 1, the structure performance of the magnetic-concentrating transverse magnetic flux motor configured by this solution can be improved by about 17%, so as to achieve the effect of not only simplifying the production process of the motor, but also increasing the power density of the motor.

For example, the lamination direction of the first stator teeth 2a and the second stator teeth 2b are orthogonal to the lamination direction of the stator yoke 1, and the magnetic field directions of the first stator teeth 2a and the second stator teeth 2b are distributed along the radial direction, and parallel to the first stator teeth 2a and the second stator teeth 2b of the radial lamination, the magnetic field direction of the stator yoke 1 is distributed along the tangential direction, and parallel to the stator yoke 1 of the axial lamination. The magnetic fields formed by two permanent magnets with the same polarity in the axial direction enter the stator teeth through the air gap, and the magnetic fields of the axially opposite stator teeth have different directions. The magnetic fields generated by the two opposite permanent magnets in the axial direction share the stator yoke connection, that is, they are summarized by the stator yoke, and are connected to the stator winding turns, and through the stator teeth on two sides, and finally form a magnetic circuit with the opposite permanent magnets on the same surface in the axial direction.

Figure 12:
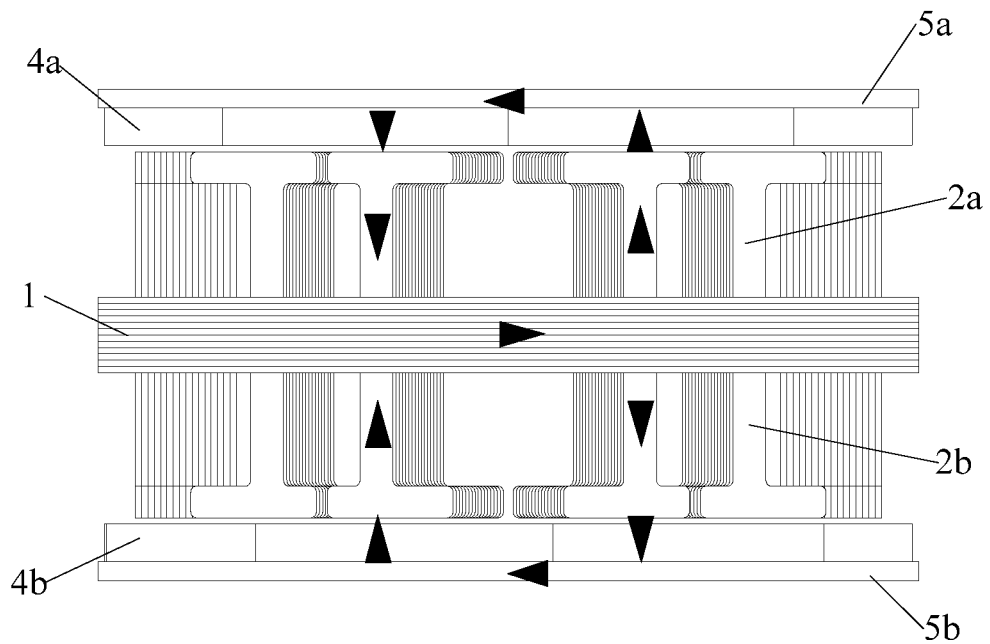
FIG. 12 is a schematic diagram of magnetic flux circuit of a transverse magnetic flux motor of an embodiment shown in FIG. 6, an arrow in the figure indicates the direction of the magnetic circuit.

As shown by the arrow in FIG. 12, the magnetic field loop generated by the first permanent magnet 4a of the first rotor flows through: one first permanent magnet 4a→the air gap between the first permanent magnet 4a and the first stator teeth 2a→one first stator teeth 2a→the shared stator yoke 1→another first stator teeth 2a→the air gap between the first stator teeth 2a and the first permanent magnet 4a→another first permanent magnet 4a→the first back iron 5a. The magnetic field loop generated by the second permanent magnet 4b of the second rotor, which is axially opposite to the first permanent magnet 4a of the above-mentioned first rotor, flows through: one second permanent magnet 4b→the air gap between the second permanent magnet 4b and the second stator teeth 2b→one second stator teeth 2b→the shared stator yoke 1→another second stator teeth 2b→the air gap between the second stator teeth 2b and the second permanent magnet 4b→another second permanent magnet 4b→the second back iron 5b. Magnetic flux concentration through a shared stator yoke 1 can greatly increase the power density of the motor compared with the solution of setting one rotor, thereby improving the structural performance of the transverse magnetic flux motor.

Figure 6:
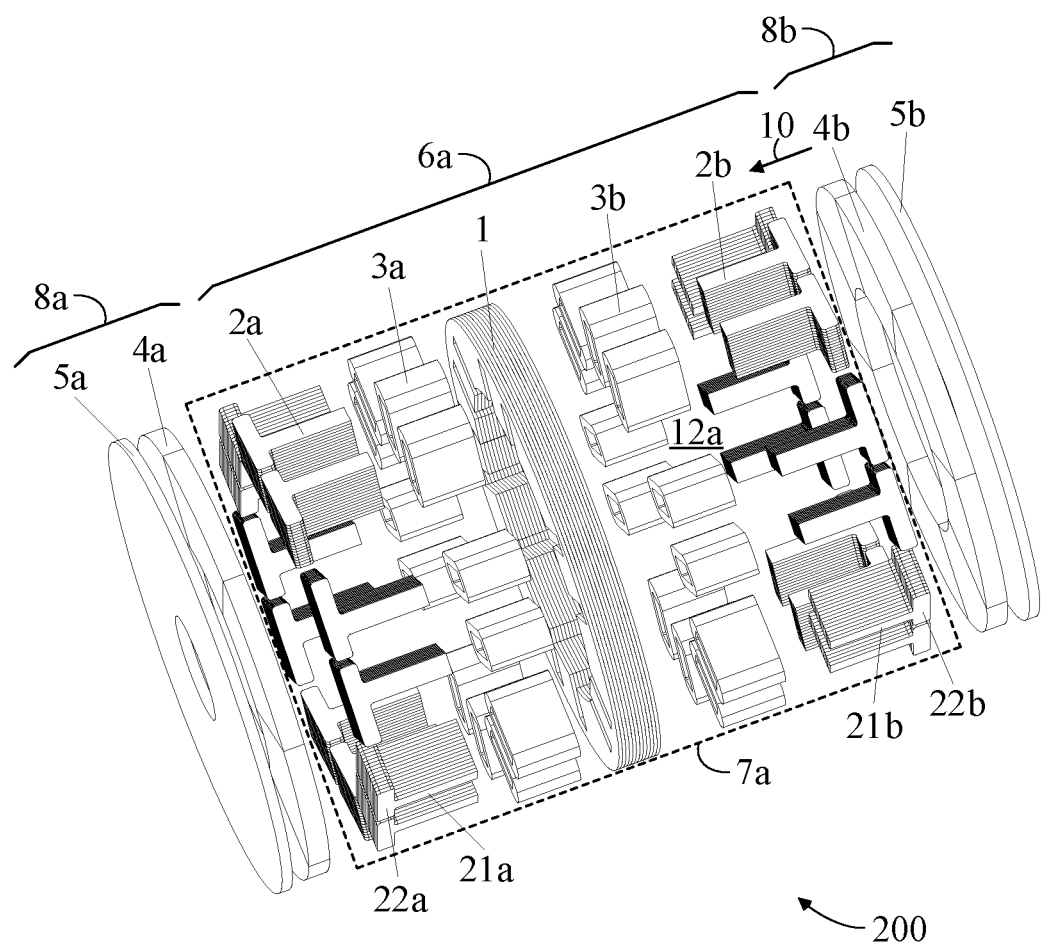
FIG. 6 is a schematic diagram of decomposition structure of a transverse magnetic flux motor of another embodiment of the present disclosure.
Figure 7:
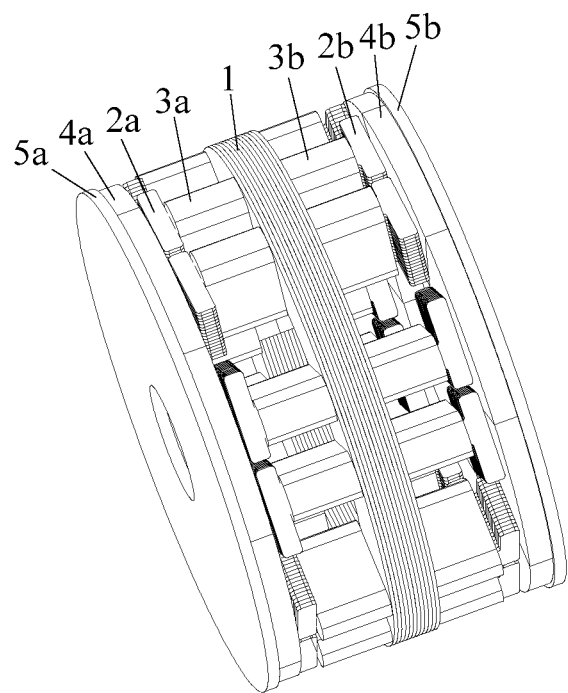
FIG. 7 is a schematic diagram of assembly structure of a transverse magnetic flux motor shown in FIG. 1.

Further, as shown in FIGS. 6 and 7, the stator comprises a first stator winding 3a and a second stator winding 3b, each of the first stator teeth 2a is wound with the first stator winding 3a, and each of the second stator teeth 2b is wound with the second stator winding 3b. Winding the first stator winding 3a and the second stator winding 3b on the first stator teeth 2a and the second stator teeth 2b correspondingly to make the winding of the first stator winding 3a and the second stator winding 3b more convenient. Compared with the stator winding wound on the stator yoke 1, it is beneficial to reduce the axial size of the motor; for example, the first stator winding 3a and the second stator winding 3b can both comprise an insulating frame and winding coils wound on the insulating frame to use the insulating frame to isolate the winding coil from the first stator teeth 2a or the winding coil from the second stator teeth 2b to provide insulation.

Figure 8:
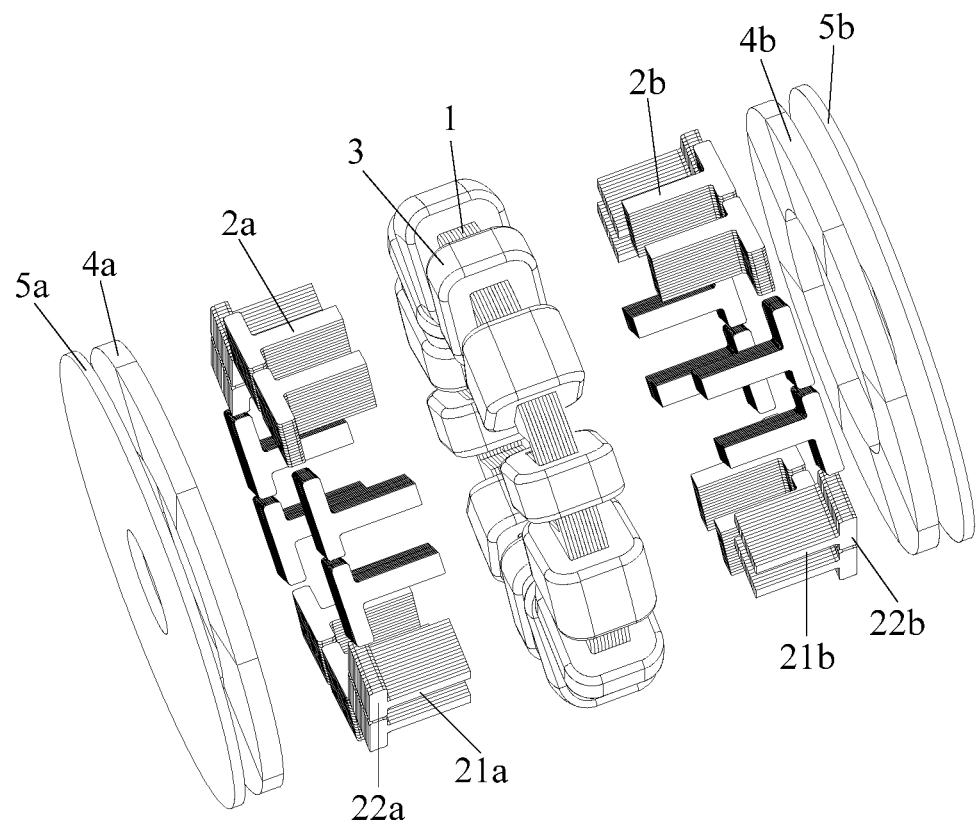
FIG. 8 is a schematic diagram of decomposition structure of a transverse magnetic flux motor of another embodiment of the present disclosure.
Figure 9:
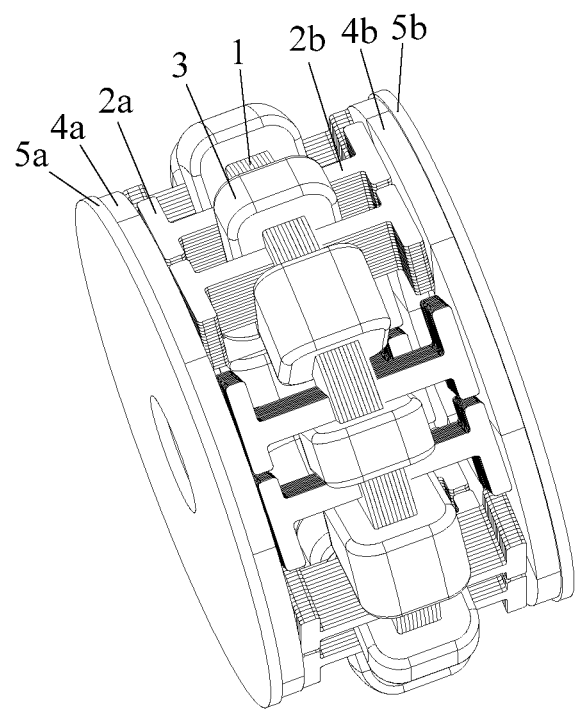
FIG. 9 is a schematic diagram of assembly structure of a transverse magnetic flux motor shown in FIG. 8.

Further, as shown in FIGS. 8 and 9, the stator comprises a stator winding 3, and the stator winding 3 is wound on the stator yoke 1 located between the adjacent first stator teeth 2a. Winding the stator winding 3 on the stator yoke 1 can also form a transverse magnetic circuit to achieve electrical and magnetic decoupling of the motor, and the groove area is no longer restricted by the magnetic load.

In some embodiment of the present disclosure, as shown in FIGS. 6 to 9 and 11, the stator yoke 1 is provided with open slots 11 equal to the number of the first stator teeth 2a, one end of the first stator teeth 2a facing the second stator teeth 2b and one end of the second stator teeth 2b facing the first stator teeth 2a oppositely inserted into the open slots 11 in the axial direction.

The first stator teeth 2a and the stator yoke 1, the second stator teeth 2b and the stator yoke 1 all adopt this plug-in connection structure, which makes the assembly operation of the first stator teeth 2a and the stator yoke 1, the second stator teeth 2b and the stator yoke 1 simple and firm. The mechanical cooperation between the first stator teeth 2a and the stator yoke 1, the second stator teeth 2b and the stator yoke 1 can be interference fit or welding fixing, etc., all of which can be firmly assembled.

Figure 11:
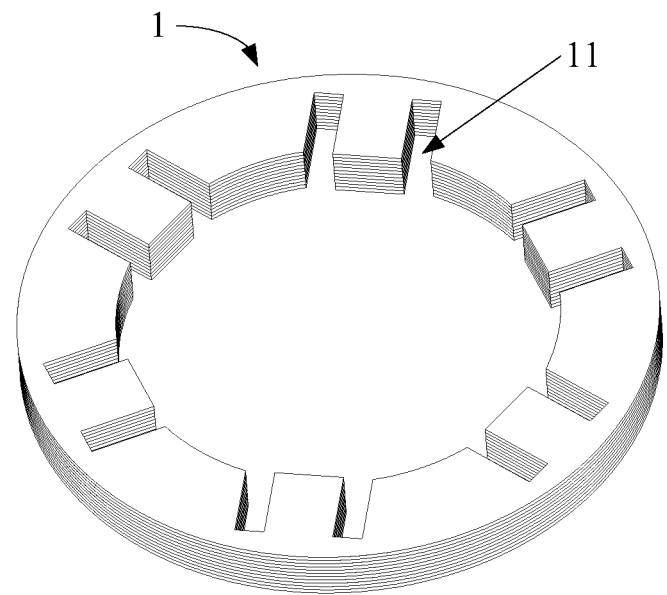
FIG. 11 is a structural schematic diagram of a stator yoke of a transverse magnetic flux motor of an embodiment shown in FIGS. 6 and 8.

Further, as shown in FIG. 11, the stator yoke 1 is in a substantial ring shape, the open slot 11 is opened on an inner side of the stator yoke 1 and extends along the radial direction of the stator yoke 1 to an outer side of the stator yoke 1, and the open slot 11 penetrates the stator yoke 1 along the axial direction. Multiple first stator teeth 2a and multiple second stator teeth 2b are fixed on the stator yoke 1 at intervals along the circumferential direction by using the open slots 11, and the multiple first stator teeth 2a and the multiple second stator teeth 2b are fixed on two sides of the stator yoke 1 along the axial direction, which ensure that the stacking direction of the stator teeth punching sheet of each of the first stator teeth 2a and each of the second stator teeth 2b is along the radial direction.

Figure 10:
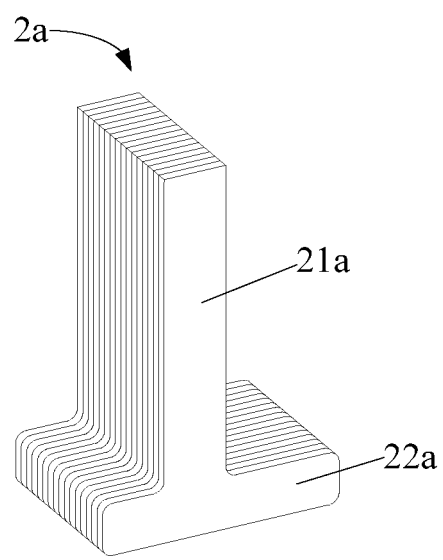
FIG. 10 is a structural schematic diagram of a stator teeth of a transverse magnetic flux motor of an embodiment shown in FIGS. 6 and 8.

Further, as shown in FIGS. 6 to 11, the first stator teeth 2a comprise a first teeth 21a extending in the axial direction and a first teeth boot 22a connected to one end of the first teeth 21a in the axial direction. As shown in FIG. 10, the first teeth boot 22a extend in a direction perpendicular to the axial direction, and two ends of the first teeth boot 22a extend out of the first teeth 21a, so that the first stator teeth 2a are in a T shape, and another end (that is, one end of the first teeth 21a away from the first teeth boot 22a) of the first teeth 21a along the axial direction is inserted into the open slot 11. The second stator teeth 2b comprise a second teeth 21b extending in the axial direction and a second teeth boot 22b connected to one end of the second teeth 21b in the axial direction. The second teeth boot 22b extend in a direction perpendicular to the axial direction, and two ends of the second teeth boot 22b extend out of the second teeth 21b, so that the second stator teeth 2b are in a T shape, and another end (that is, one end of the second teeth 21b away from the second teeth boot 22b) of the second teeth 21b along the axial direction is inserted into the open slot 11.

For example, the first teeth 21a and the second teeth 21b extending in the axial direction have a shorter size perpendicular to the axial direction (that is, along the tangential direction), and the first teeth 21a and the second teeth 21b are used for winding the stator winding to leave enough space for the winding. The first teeth 21a and the second teeth 21b are used to conduct magnetism to form a magnetic circuit. The first teeth boot 22a and the second teeth boot 22b, extending in the direction perpendicular to the axial direction, have a longer size in the direction perpendicular to the axial direction (that is, along the tangential direction). The first teeth boot 22a and the second teeth boot 22b can collect the magnetic flux from the rotor, which has a good magnetizing effect, thereby increasing the performance output of the motor.

In an embodiment of the present disclosure, as shown in FIG. 11, the stator yoke punching sheet is formed by bending a strip-shaped punching sheet, the strip-shaped punching sheet is provided with groove, and after the strip-shaped punching sheet is rounded, the groove area of the groove is reduced, and the shape and size of the reduced groove are adapted to the cross-sectional shape and size of one end of the first stator teeth 2a facing the second stator teeth 2b and one end of the second stator teeth 2b facing the first stator teeth 2a.

The stator yoke punching sheet formed by bending the strip-shaped punching sheet.

Compared with the round punching sheet, the intermediate waste can be reduced, thereby improving the utilization rate of the punching sheet materials and facilitating reduction of material costs. The shape and size of the slot on the strip-shaped punching sheet can be configured reasonably according to the actual situation. For example, if a rectangular open slot 11 needs to be formed after being rounded, a trapezoidal slot with a relatively wide opening on the strip-shaped punching sheet can be configured, and the width of the opening is reduced after rounding, forming a rectangular open slot 11 with the same opening width as the bottom of the slot. Further, after the strip-shaped punching sheet is rounded, the groove area of the groove is equal to the axial cross-sectional area of the tooth tops (that is, one end of the first stator teeth 2a inserting and fitting with the stator yoke 1, one end of the second stator teeth 2b inserting and fitting with the stator yoke 1) of the stator teeth 2 (the first stator teeth 2a, the second stator teeth 2b).

For example, the stator yoke 1 is formed by stacking multiple strip-shaped punching sheet after being rounded, and each of the strip-shaped punching sheets has the same shape, and slots are opened on each of the strip-shaped punching sheets, and the number of slots in the annular stator yoke punching sheet formed by stacking is equal to the number of first stator teeth 2a or second stator teeth 2b of the transverse magnetic flux motor. After the strip-shaped punching sheet is rounded, the groove area of the groove becomes smaller, and the groove area is equal to the axial cross-sectional area of the tooth top of the first stator teeth 2a, and equal to the axial cross-sectional area of the tooth top of the second stator teeth 2b. Each of the stacked stator teeth (the first stator teeth 2a and the second stator teeth 2b) is placed in the open slot 11 of the stator yoke 1 formed after being rounded and stacked.

In another embodiment of the present disclosure, the stator yoke punching sheet is formed by punching a circular punching sheet, and the open slot 11 is a tooth groove set on the lamination plane of the stator yoke 1, which makes the processing of the stator yoke punching sheet convenient and manufacturing cost low.

In further another embodiment of the present disclosure, the stator yoke 1 is formed by assembling a plurality of stator yoke devices along the circumferential direction, and a gap is left between the adjacent stator yoke devices to form the open slot 11, or the open slot 11 is provided on the stator yoke device. After the assembly is completed, the number of open slots 11 formed on the stator yoke 1 is equal to the number of the first stator teeth 2a or the second stator teeth 2b. This reduces the length of the punching sheet that composes each of the stator yoke devices, which facilitates the smooth stacking of each of the stator yoke devices.

Further, the stator 6a comprises a stator housing 7a, and an integrated structure formed by the first stator teeth 2a, the second stator teeth 2b, the stator yoke 1 and the stator winding is plastic-encapsulated in the stator housing. For example, in the case where the first stator winding 3a and the second stator winding 3b are wound on the first stator teeth 2a and the second stator teeth 2b, respectively, the stator winding comprises the first stator winding 3a and the second stator winding 3b. That is, an integrated structure formed by the first stator teeth 2a, the second stator teeth 2b, the stator yoke 1, the first stator winding 3a and the second stator winding 3b is plastic-encapsulated in the stator housing. In the case where the stator winding 3 is wound on the stator yoke 1, an integrated structure formed by the first stator teeth 2a, the second stator teeth 2b, the stator yoke 1 and the stator winding 3 is plastic-encapsulated in the stator housing. For example, the stator assembly comprising the first stator teeth 2a, the second stator teeth 2b, the stator yoke 1, and the stator winding is wrapped by a filling material 12a, and the stator assembly is plastic-encapsulated in the stator housing, and the filling material may be a mass mold plastic.

In summary, the transverse magnetic flux motor provided by the embodiments of the present disclosure can not only simplify the production process of the motor, but also increase the power density of the motor. Through the configuration of the transverse magnetic circuit structure, the electrical and magnetic decoupling of the motor is realized, and the groove area is no longer restricted by the magnetic load. By stacking the stator teeth in the radial direction, the manufacturability of the transverse magnetic flux motor can be greatly improved. The shape of each of the stator teeth punching sheets of the stator teeth stacked in the radial direction is the same, ensuring the efficiency of mass production. Through the separated yoke part laminated in the axial direction, the manufacturability of the transverse magnetic flux motor is greatly improved, and at the same time the power density of the motor is increased. Compared with the existing transverse magnetic flux motor, the structure performance of the motor using this separated yoke part is improved by about 13%. By the polarities of the permanent magnets corresponding in the axial direction are the same, and the magnetic flux is concentrated through the shared stator yoke 1, the power density of the existing motors can be greatly improved. On the basis of the motor structure of the above-mentioned separated stator yoke 1, the structure performance of the magnetic-concentrating transverse magnetic flux motor provided by this solution can be improved by about 17%.

In the description of the present disclosure, the term "plurality" refers to two or more than two, unless clearly defined otherwise, the terms "upper", "lower" and the like indicate orientations or positional relationships based on those shown in the drawings and are merely intended to facilitate and simplify the description rather than to indicate or imply that the apparatus or unit referred to must have a particular direction or be constructed and operated in a particular orientation. Therefore, the above terms are not to be construed as limiting the invention. The terms "connected", "mounted", "fixed", and the like are to be construed broadly, for example, the term "connected" may refer to a fixed connection, a flexible connection, or an integral connection; the term "coupled" may refer to a direct connection or an indirect connection through an intermediary. The specific meaning of the above terms in the present disclosure will be understood by those of ordinary skill in the art, as the case may be.

In the description herein, the terms "an embodiment", "some embodiments", "exemplary embodiments" and the like indicate that a particular feature, structure, material, or characteristic described in connection with the embodiment or example is comprised in at least one embodiment or example of the invention. Herein, schematic representations of the above terms do not necessarily refer to the same embodiment or example. Furthermore, the particular features, structures, materials, or characteristics described may be combined in any suitable manner in any one or more embodiments or examples.

While the invention has been particularly shown and described with reference to preferred embodiments thereof, it will be understood by those skilled in the art that the present disclosure is not limited thereto and various changes in form and details may be made therein. It is intended that any modifications, equivalent substitutions and improvements of this invention shall fall within the scope of the present disclosure without departing the spirit of this disclosure.

What is claimed is:

1. A transverse magnetic flux motor comprising:
   a stator, comprising a stator yoke a plurality of stator teeth arranged at intervals along a circumferential direction of the stator yoke, the stator yoke comprising a plurality of stator yoke punching sheets laminated in an axial direction of the stator yoke, and each of the plurality of stator teeth comprising a plurality of stator teeth punching sheets with a same shape laminated in a radial direction of the stator yoke, the plurality of the stator teeth being fixed on one side of the stator yoke in the axial direction of the stator yoke, and a plurality of stator windings provided on the stator yoke; and
   a rotor, arranged on the one side of the stator yoke near the plurality of stator teeth in the axial direction of the stator yoke, the rotor comprising a back iron and a plurality of permanent magnets arranged in sequence along the circumferential direction of the stator yoke, each of the plurality of permanent magnets being magnetized along the axial direction of the stator yoke, and polarities of adjacent permanent magnets of the plurality of permanent magnets being different from one another,
   wherein the stator yoke is provided with a plurality of open slots, wherein the number of the plurality of open slots is equal to the number of the plurality of stator teeth, and one end of each of the plurality of stator teeth along the axial direction of the stator yoke is correspondingly inserted into a respective open slot of the plurality of open slots, and
   wherein the stator yoke is substantially of a ring shape, and each open slot of the plurality of open slots is opened on an inner side of the stator yoke, extends along the radial direction of the stator yoke towards an outer side of the stator yoke, and arranged between adjacent stator windings of the plurality of stator windings.

2. The transverse magnetic flux motor according to claim 1, wherein:
   each stator tooth of the plurality of stator teeth comprises a tooth extending in the axial direction of the stator yoke and a tooth boot connected to one end of the tooth in the axial direction of the stator yoke, the tooth boot extends in a direction perpendicular to the axial direction of the stator yoke, and two ends of the tooth boot extend out of the tooth, so that the each stator tooth is of a T shape, and another end of the tooth along the axial direction of the stator yoke is inserted into a respective open slot of the plurality of open slots.

3. The transverse magnetic flux motor according to claim 1, wherein:
   each of the plurality of stator yoke punching sheets is formed by bending a strip-shaped punching sheet, and the strip-shaped punching sheet is provided with a groove, and
   after the strip-shaped punching sheet is rounded, the groove area of the groove is reduced, and the shape and size of the reduced groove area of the groove are adapted to the cross-sectional shape and size of the one end of the each of the plurality of stator teeth in the axial direction of the stator yoke.

4. The transverse magnetic flux motor according to claim 1, wherein:
   each of the plurality of stator yoke punching sheets is formed by punching a circular punching sheet, and a respective open slot is a tooth groove provided on a lamination plane of the stator yoke.

5. The transverse magnetic flux motor according to claim 1, wherein:
   the stator yoke is formed by assembling a plurality of stator yoke devices along the circumferential direction of the stator yoke, and a gap is left between adjacent stator yoke devices to form a respective open slot, or the respective open slot is provided on a stator yoke device of the plurality of stator yoke devices.

6. The transverse magnetic flux motor according to claim 1, wherein:
   the stator comprises a stator housing, wherein an integrated structure formed by the plurality of stator teeth, the stator yoke and the plurality of stator windings is plastic-encapsulated in the stator housing.

7. A transverse magnetic flux motor comprising:
   a stator, comprising a stator yoke, a plurality of first stator teeth and a plurality of second stator teeth, and the plurality of the first stator teeth and the plurality of the second stator teeth being arranged at intervals along a circumferential direction of the stator yoke and being relatively fixed on two sides of the stator yoke in an axial direction of the stator yoke, the stator yoke comprising a plurality of stator yoke punching sheets laminated in the axial direction, each of the first stator teeth and each of the second stator teeth comprising a plurality of stator teeth punching sheets with a same shape laminated in a radial direction of the stator yoke; and
   a first rotor and a second rotor, being separately arranged on two sides of the stator in the axial direction, the first rotor comprising a first back iron and a plurality of first permanent magnets being arranged in sequence along the circumferential direction, and each first permanent magnet being magnetized along the axial direction, and polarities of the adjacent first permanent magnets being different from one another, wherein the second rotor comprises a second back iron and a plurality of second permanent magnets being arranged in sequence along the circumferential direction, each second permanent magnet being magnetized along the axial direction, the polarities of the adjacent second permanent magnets being different from one another, and each first permanent magnet and a respective second permanent magnet being mirror-symmetrical, and symmetric surfaces of said each first permanent magnet and the respective second permanent magnet at a same axial position having a same polarity, wherein the stator yoke is provided with a plurality of open slots, wherein the number of the plurality of open slots is equal to the number of the first stator teeth, and one end of the first stator teeth facing the second stator teeth and one end of the second stator teeth facing the first stator teeth are oppositely inserted into the open slots in the axial direction, and wherein the stator yoke is substantially of a ring shape, each open slot is opened on an inner side of the stator yoke and extends along the radial direction of the stator yoke to an outer side of the stator yoke, and said each open slot penetrates the stator yoke along the axial direction.

8. The transverse magnetic flux motor according to claim 7, wherein:

the stator comprises at least one stator winding, the at least one stator winding comprises a first stator winding and a second stator winding, each of the first stator teeth is wound with the first stator winding, and each of the second stator teeth is wound with the second stator winding.

9. The transverse magnetic flux motor according to claim 7, wherein:

the stator comprises a stator winding, and the stator winding is wound on the stator yoke located between adjacent first stator teeth.

10. The transverse magnetic flux motor according to claim 7, wherein:

each first stator tooth comprises a first tooth extending in the axial direction and a first tooth boot connected to one end of the first tooth in the axial direction, the first tooth boot extending in a direction perpendicular to the axial direction, and two ends of the first tooth boot extending out of the first tooth, so that said each first stator tooth is of a T shape, and another end of the first tooth along the axial direction is inserted into a respective open slot, each second stator teeth comprises a second tooth extending in the axial direction and a second tooth boot connected to one end of the second tooth in the axial direction, the second tooth boot extending in a direction perpendicular to the axial direction, and two ends of the second tooth boot extending out of the second tooth, so that said each second stator teeth is of a T shape, and another end of the second tooth along the axial direction is inserted into a respective open slot.

11. The transverse magnetic flux motor according to claim 7, wherein:

each stator yoke punching sheet is formed by bending a strip-shaped punching sheet, the strip-shaped punching sheet is provided with a groove, and after the strip-shaped punching sheet is rounded, the groove area of the groove is reduced, and the shape and size of the reduced groove are adapted to the cross-sectional shape and size of one end of the first stator teeth facing the second stator teeth and one end of the second stator teeth facing the first stator teeth.

12. The transverse magnetic flux motor according to claim 7, wherein:

each stator yoke punching sheet is formed by punching a circular punching sheet, and a respective open slot is a tooth groove provided on the lamination plane of the stator yoke.

13. The transverse magnetic flux motor according to claim 7, wherein:

the stator yoke comprises a plurality of stator yoke devices arranged along the circumferential direction, and a gap is left between adjacent stator yoke devices to form a respective open slot, or the open slot is provided on the stator yoke device.

14. The transverse magnetic flux motor according to claim 7, wherein:

the stator comprises a stator housing, wherein an integrated structure formed by the first stator teeth, the second stator teeth, the stator yoke and the stator winding is plastic-encapsulated in the stator housing.

\* \* \* \* \*